(12) United States Patent
Hanna et al.

(10) Patent No.: US 9,139,169 B2
(45) Date of Patent: *Sep. 22, 2015

(54) RELEASE MECHANISM FOR A PARKING BRAKE CLUTCH

(75) Inventors: Ronald J. Hanna, Mancelona, MI (US); Adam W. Remesz, Clinton Township, MI (US)

(73) Assignee: Dura Operating LLC, Auburn Hills, MI (US)

( * ) Notice: Subject to any disclaimer, the term of this patent is extended or adjusted under 35 U.S.C. 154(b) by 866 days.

This patent is subject to a terminal disclaimer.

(21) Appl. No.: 11/830,414

(22) Filed: Jul. 30, 2007

(65) Prior Publication Data

US 2008/0041185 A1 Feb. 21, 2008

Related U.S. Application Data (60) Provisional application No. 60/822,788, filed on Aug. 18, 2006.

(51) Int. Cl.
*B60T 11/04* (2006.01)
*G05G 5/00* (2006.01)
*G05G 1/14* (2006.01)
*B60T 7/06* (2006.01)
*B60T 7/04* (2006.01)
*B60T 7/10* (2006.01)

(52) U.S. Cl.
CPC . *B60T 7/06* (2013.01); *B60T 7/045* (2013.01); *B60T 7/104* (2013.01); *B60T 7/108* (2013.01); *Y10T 74/20528* (2015.01); *Y10T 74/20636* (2015.01)

(58) Field of Classification Search
USPC .................... 74/512–514, 560, 529
See application file for complete search history.

(56) References Cited

U.S. PATENT DOCUMENTS

| | | | | |
|---|---|---|---|---|
| 2,063,379 A | * | 12/1936 | Hobbs | 192/13 R |
| 2,884,805 A | * | 5/1959 | Krause | 74/531 |
| 2,935,895 A | * | 5/1960 | Krause | 74/531 |
| 3,011,606 A | * | 12/1961 | Ferris et al. | 192/45.008 |
| 3,648,813 A | * | 3/1972 | Walters et al. | 192/70.252 |
| 4,618,331 A | * | 10/1986 | Deal | 474/49 |
| 4,762,332 A | | 8/1988 | Seol | |
| 5,467,666 A | * | 11/1995 | Soucie et al. | 74/575 |
| 5,528,956 A | * | 6/1996 | Harger et al. | 74/517 |
| 5,547,055 A | | 8/1996 | Chang | |

(Continued)

FOREIGN PATENT DOCUMENTS

| | | | | |
|---|---|---|---|---|
| DE | 20020759 | | 2/2001 | |
| GB | 943622 | | 12/1963 | |
| JP | 57-194143 | * | 11/1982 | B60T 7/04 |

OTHER PUBLICATIONS

English Abstract of JP 57-194143.*

*Primary Examiner* — Vinh Luong
(74) *Attorney, Agent, or Firm* — Gifford, Krass, Sprinkle, Anderson & Citkowski, P.C.

(57) ABSTRACT

A parking brake assembly which includes a brake lever, a rotary clutch and a lock-release mechanism which cooperate to selectively lock and release a parking brake. The clutch allows actuation of the brake lever in one direction and prevents movement of the brake lever in an opposite direction. The lock-release mechanism allows selective movement of the rotary clutch and the brake lever together in the opposite direction. The rotary clutch may be disposed generally coaxially with a pivot axis of the brake lever.

22 Claims, 9 Drawing Sheets

(56) References Cited

U.S. PATENT DOCUMENTS

| | | | |
|---|---|---|---|
| 5,609,066 A * | 3/1997 | Bunker et al. | 74/537 |
| 5,794,492 A * | 8/1998 | Pare' | 74/529 |
| 5,832,784 A * | 11/1998 | McCallips et al. | 74/512 |
| 6,382,048 B1 * | 5/2002 | Youn et al. | 74/529 |
| 6,745,882 B2 | 6/2004 | Ai | |
| 6,902,046 B1 | 6/2005 | Dumas | |
| 6,973,852 B2 * | 12/2005 | Shin et al. | 74/535 |
| 6,997,295 B2 | 2/2006 | Pederson et al. | |
| 7,055,665 B2 * | 6/2006 | Shiraishi et al. | 192/45.017 |
| 7,574,943 B2 * | 8/2009 | Wortmann | 74/512 |
| 8,025,129 B2 * | 9/2011 | Gresley | 188/2 D |
| 2008/0041689 A1 * | 2/2008 | Hanna et al. | 192/219.5 |
| 2010/0257972 A1 * | 10/2010 | Gresley | 74/502.2 |

\* cited by examiner

RELEASE MECHANISM FOR A PARKING BRAKE CLUTCH

REFERENCE TO RELATED APPLICATIONS

This application claims priority to U.S. provisional patent application No. 60/822,788, which was filed Aug. 18, 2006 and is incorporated herein by reference in its entirety.

FIELD OF THE INVENTION

The invention relates to parking brake assemblies for motor vehicles. More particularly, the invention relates to a lock-release mechanism for selectively releasing a clutch of a parking brake mechanism.

BACKGROUND OF THE INVENTION

Generally, parking brake assemblies for automobiles, among other things, include a lock-release mechanism made up of a sector gear and lock pawl which cooperate to provide a ratcheting type directional locking of the parking brake and an actuator to disengage the lock pawl from the gear sector to release the parking brake or a helical spring. Examples of parking brakes can be found in U.S. Pat. Nos. 4,850,242; 5,309,786; 5,881,605; 5,001,942; 5,448,928; 5,211,072; 5,875,688; 5,182,963; 5,588,335; 5,832,784; 5,533,420; 6,662,676, the disclosures of which are herein incorporated by reference.

One of the issues with conventional parking brake systems is that they do not package equally across multiple car platforms. There is, therefore, a need in the art for a parking brake assembly that has improved packaging with sufficient performance such that the system can be more readily adapted across multiple vehicle platforms.

Another issue with conventional brakes is brake lever travel loss. Brake lever travel loss is a term generally understood in the art. Essentially, brake lever travel loss results in the necessity of over applying a parking brake. As such there is a need in the art for a parking brake assembly that has reduced brake lever travel loss.

SUMMARY OF THE INVENTION(S)

To address one or more issues with parking brake assemblies of today, there is disclosed herein an improved parking brake assembly for use in a motor vehicle. The parking brake assembly in one embodiment includes a brake lever, a roller clutch, and a lock-release mechanism. The parking brake assembly also includes a pivot shaft interconnected to the motor vehicle by a fixed support. The brake lever is pivotally coupled to the pivot shaft by a main pivot. The roller clutch has a roller support disposed generally coaxially with the main pivot. The roller clutch has at least one unidirectional roller disposed between the main pivot and the roller support and allows unidirectional movement of the main pivot and brake lever relative to the roller support. The roller support is rotatably coupled to the fixed support. The lock-release mechanism has a block selectively movable between a locked position operatively engaged between the fixed and roller supports to prevent rotation of the roller support relative to the fixed support and an unlocked position disengaged from the roller support to allow rotation of the roller support, main pivot and lever together in a direction opposite the unidirectional movement.

A parking brake assembly according to another embodiment includes a brake lever, a roller clutch and a lock-release mechanism. The roller clutch is connected to the brake lever and allows unidirectional movement of the brake lever. The roller clutch has a roller support. The lock-release mechanism releasably fixes the movement of the roller support using a force that is non-normal to a torque load applied to the roller clutch.

In another embodiment, the parking brake assembly includes a brake lever, a primary cable, a clutch and a lock-release mechanism. The primary brake cable operatively connects the brake lever and the brake of the motor vehicle. The clutch is connected to the brake lever and allows unidirectional movement of the brake lever for actuating the brake via the primary brake cable. The lock-release mechanism is connected to the roller clutch and allows movement of the brake lever in a direction opposite the unidirectional movement allowed by the clutch. The parking brake assembly has a primary cable travel loss of less than one millimeter.

DETAILED DESCRIPTION OF PREFERRED EMBODIMENTS

Referring to FIGS. 1-4, a parking brake assembly is generally indicated at 10. The parking brake assembly 10 includes a lever 12, a rotary clutch 8 coupled with the lever 12 and a lock-release mechanism 16 coupled with the rotary clutch 8. Described in greater detail below, the rotary clutch 8 allows the lever 12 to be moved from a released position to an actuated position, locked in the actuated position, and selectively unlocked from the actuated position and returned to the released position.

The parking brake assembly 10 may be any suitable brake actuation device, such as a pedal type, hand type, electronic type, push to release, pull to release, self adjust or cable type parking brake actuator. Illustratively, the parking brake assembly 10 is shown as a pedal type brake actuation device utilizing a foot-actuated lever 12. If the parking brake assembly 10 is used for a cable-driven parking brake system, then the lever 12 may be coupled to a cable via a cable connector 14. The lever 12 may be movably or pivotally supported in the system in any suitable manner. In the illustrated embodiment, the lever 12 is fixedly secured to a sleeve or pivot 18 that is, in turn, pivotally coupled to a pivot shaft 20 having ends fixedly connected to supports 22, 24. By this arrangement, the lever 12 moves together with the main pivot 18 about the pivot shaft 20. It should be appreciated, however, that the main pivot 18 and pivot shaft 20 may be supported in any suitable manner, such as by a pedal box, bracket, other frame member, using multiple shafts, etc. The main pivot 18, as shown, extends into the lever 12 and is fixedly secured thereto for movement therewith about the pivot shaft. Alternatively, the main pivot 18 may be made formed integrally with the lever 12.

It has been found that a rotary clutch 8 can allow a suitable holding force at a radius closer to the center of the axis of rotation 25 with little to no brake lever travel loss on apply. In some cases, the clutch contact point can be positioned within one inch or less of the axis of rotation 25 (FIG. 2) of the main pivot 18 or lever 12. This ability is particularly advantageous when used in a foot pedal controlled parking brake, as now the overall packaging can be reduced and still allow for adequate holding force of an actuated parking brake with reduced lever travel loss. In the illustrated embodiments, the rotary clutch 8 is positioned to directly engage and impinge upon an outer cylindrical surface 19 of the main pivot 18. The rotary clutch 8 may also be positioned in alternative positions not directly engaging the main pivot 18, such as on another member that is linked to the main pivot 18, such as a secondary pivot or to the lever 12, etc. A preferred rotary clutch 8 has 0.1 mm or less return or slop, more preferably has less than 0.05 mm, and most preferably has less than 0.01 mm.

Examples of rotary clutches 8 include roller clutches, sprag clutches, frictional clutches, etc. In tie illustrated embodiments, the rotary clutch 8 is provided as a roller clutch having one or more unidirectional roller members 32. An advantage of a roller clutch 8 is that the roller clutch 8 can allow precise, smooth or non-ratcheting movement of a controlled member in one direction, while preventing rotary movement of the controlled member in an opposite locking direction. The roller clutch 8 includes a roller support 34 for supporting the one or more roller members 32. The roller members 32 may be positioned between a suitable surface of the roller support 34 and a bearing surface of an adjacent component to be controlled, such as the main pivot 18. In the illustrated embodiment, the roller members 32 are disposed between the outer cylindrical surface 19 of the main pivot 18 and an inside circumferential surface 33 of the roller support 34. In one embodiment, the roller members 32 may be engagable with notches (not shown) formed along the inside circumferential surface 33 of the roller support 34. The notches would allow the roller members 32 to rotate in one direction to allow rotation of the main pivot 18 relative to the roller support 34 and wedge or lock in an opposite locking direction to prevent rotation of the main pivot 18 relative to the roller support 34. In this case, springs (not shown) may be used to bias the roller members 32 out of the wedged or locked state.

To improve packaging, the rotary clutch 8 may be substantially coaxially aligned with the main pivot 18. In this embodiment, the rotary clutch 8 allows for free rotation of the main pivot 18 in a moving direction (such as when the lever 12 is moved by a user to engage the parking brake assembly 10) and prevents return of the main pivot 18 (and lever 12) in the opposite locking direction. To permit movement of the lever 12 in the opposite direction the rotary clutch 8 may be used in combination with a lock-release mechanism 16. As such, a rotary clutch 8 in combination with a lock-release mechanism 16 can allow unidirectional movement of a pivot 18 (or some other controlled member) when the lock-release mechanism 16 is engaged, and rotation of the rotary clutch 8 (i.e. parts of the clutch, such as the clutch support 34 or the entire clutch) in another direction when the lock-release mechanism 16 is disengaged. A preferred rotary clutch 8 and lock-release mechanism 16 permits primary cable travel loss of 1 mm or less. In one aspect the primary cable travel loss may be less than 0.5 mm and in another aspect less than 0.15 mm.

In general, the lock-release mechanism 16 may be any suitable engagement/disengagement member or device for locking and releasing a controlled member. The lock-release mechanism 16 may be manually or power actuated. It should be appreciated that a controlled member can be any of one or more, temporarily constrained element(s), such as a pinion, housing, support, pivot, link, shaft, adapter, adapter for attachment to a roller clutch, a roller support, etc. In the present embodiment, the controlled member is the clutch 8.

Figure 2:
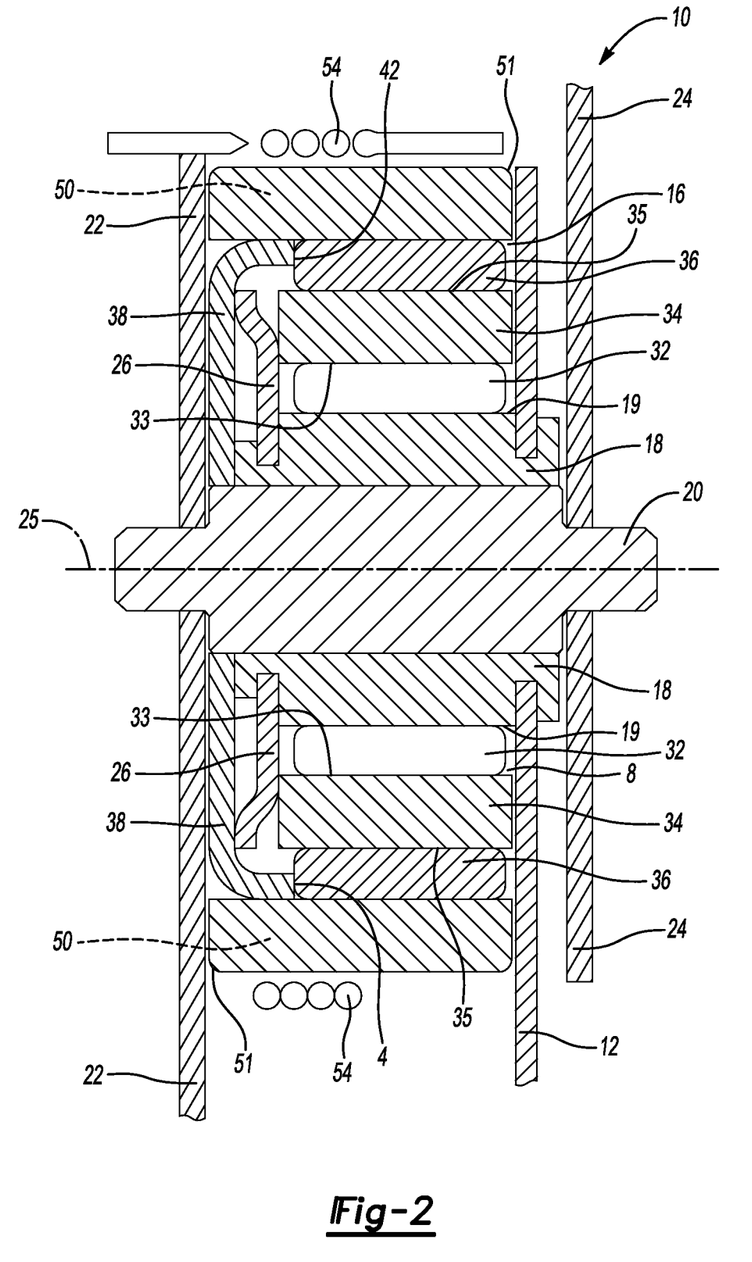
FIG. 2 is a cross sectional view of the parking brake assembly according to one embodiment taken along the line 2, 8 of FIG. 1.
Figure 3:
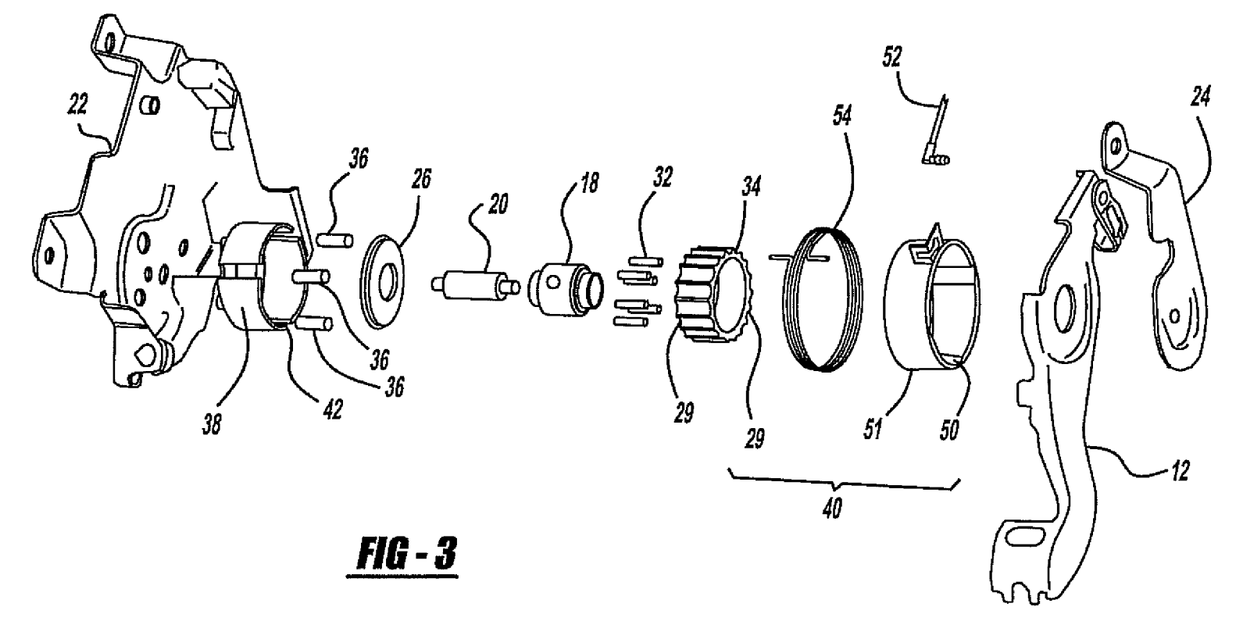
FIG. 3 is an exploded perspective view of the parking brake assembly.
Figure 7:
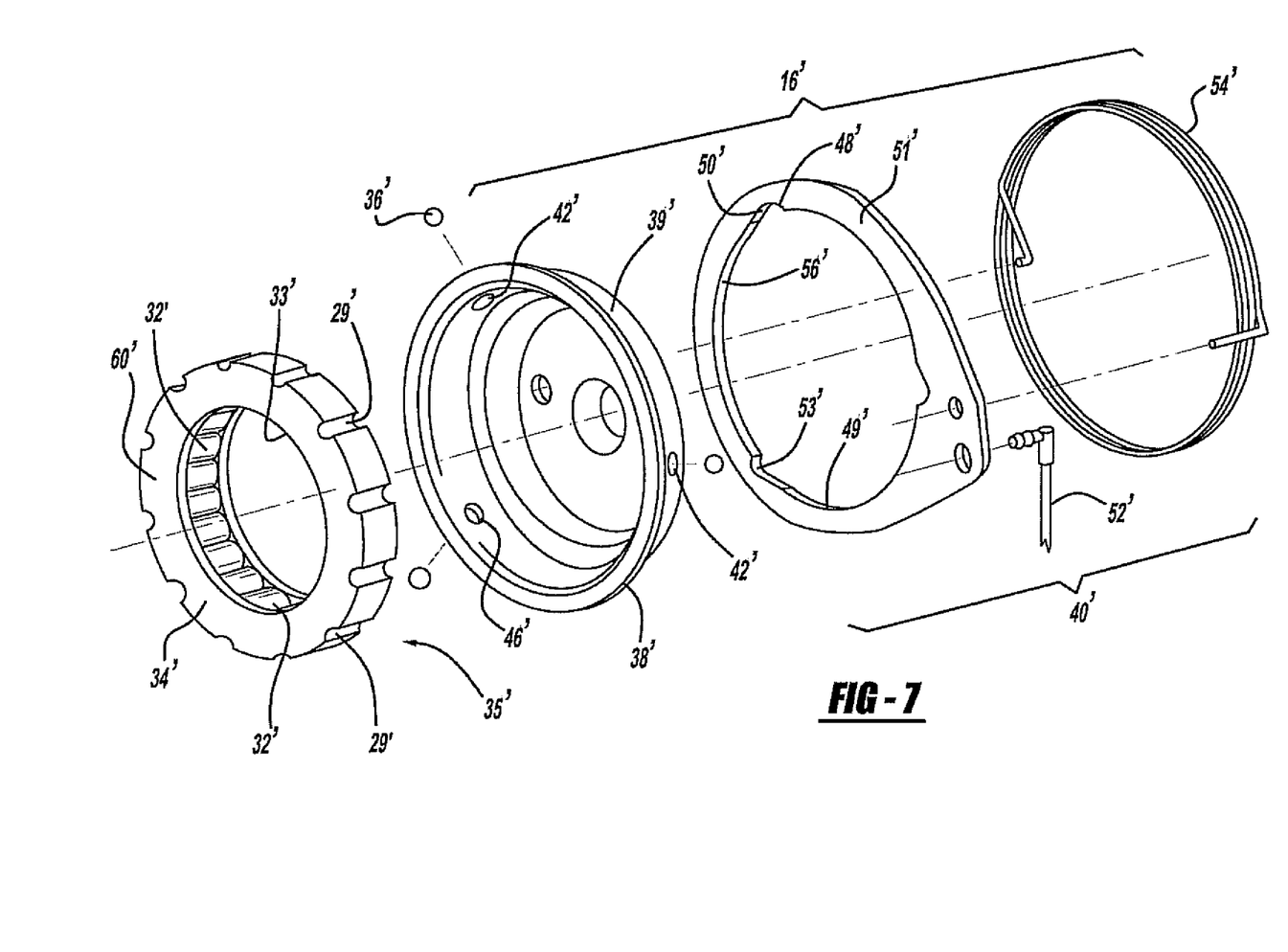
FIG. 7 is an exploded perspective view of the parking brake assembly according to a second embodiment.
Figure 8:
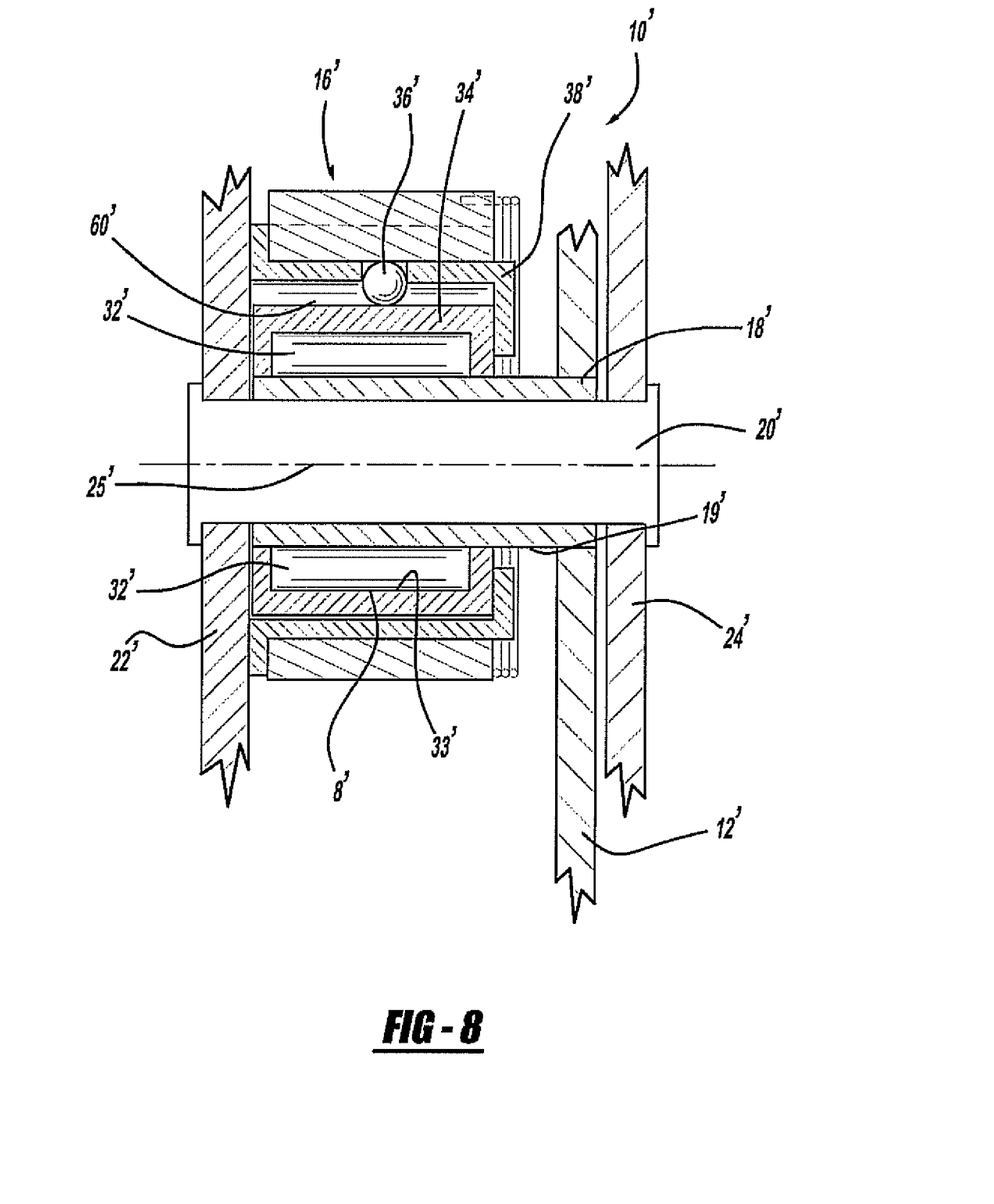
FIG. 8 is a cross sectional view of the clutch and lock-release mechanism according to the second embodiment taken along the line 2, 8 of FIG. 1.

As shown in FIGS. 2 and 3, the lock-release mechanism 16 includes a block 36 engagable with any one of a plurality of notches 29 on the outer circumference 35 of the roller support 34. As shown, the blocks 36 are provided as cylindrically shaped pins. Alternatively, as shown in a second embodiment in FIGS. 7 and 8, the blocks 36' may be provided as balls rather than pins as in the first embodiment.

Referring back to FIGS. 2 and 3, the lock-release mechanism 16 includes a guide member 38 for locating and movably supporting the block 36. The guide member 38 may be any suitable position fixing device, such as a bearing, block, strap, flange, housing, etc. The guide member 38 in the illustrated embodiment is a bell housing with a flange adapted for attaching the guide member 38 to a suitable support in the vehicle, such as the pedal box or brackets. The guide member 38 may be attached to a suitable support by any suitable means, including welding, rivets, bots, screws, adhesives, etc. The guide member 38 preferably has a bearing surface 39. In the illustrated embodiment, the bearing surface 39 is generally cylindrical. The guide member 38 preferably includes a check 42 for allowing location of the block 36. The check 42 in this example is in the form of a pass-through slot in the guide member 38. While three slots 42 are shown in the pictured embodiment of FIG. 3, it should be realized that any number of slots 42 may be utilized, depending generally on the requirements of a specific application. The slots 42, are illustratively equally spaced circumferentially about the circumference of the guide member 38.

Figure 4:
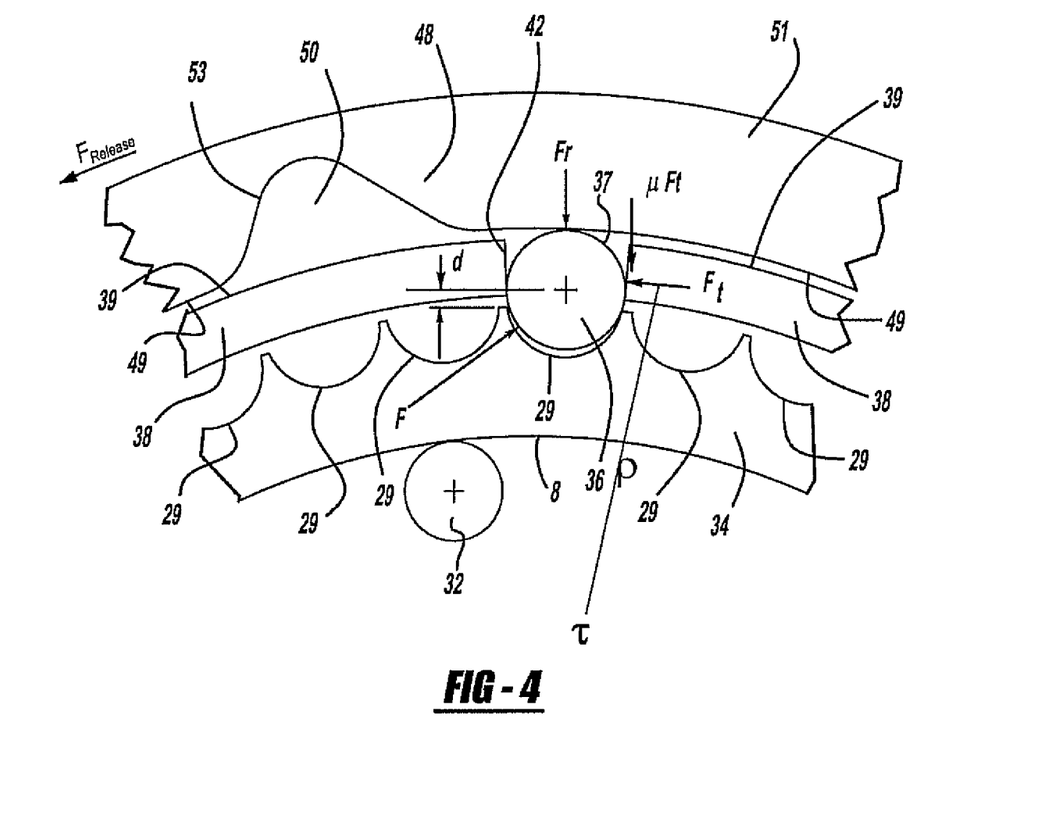
FIG. 4 is an enlarged partial side view of the clutch and lock-release mechanism.

The lock-release mechanism 16 also includes an actuator 40. The actuator 40 may be any suitable actuating member or device for engaging and disengaging the lock-release mechanism 16 and may be manually actuated or powered. In generally, the actuator 40 engages tie block 36 with a force vector or force that is non-normal to a torque load applied to some controlled member (e.g. the clutch 8). By applying the force to the block 36 at an angle that is non-normal to the torque load applied to the controlled member, the force required by the actuator 40 to engage the block 36 can be reduced. Referring to FIG. 4, the force $F_{Release}$ needed to initiate the actuator may be generally seen as a component of the radial force Fr multiplied by the coefficient of friction μ. The force Fr is a function of the force F of the block 36 in relation to the controlled member 8 and the distance d from the center of the block 36 to the controlled member 8. The force Fr needed to keep the block 36 in place will be a function of the torque (τ) applied to the controlled member 36. Ft indicates the tangential force applied to the controlled member 36, where $Ft=\tau/radius$. The force Fr may be reduced as the angle between Ft and F is reduced. The angle may be reduced in any suitable manner. The angle is preferably reduced by using one or more curved bearing surfaces. As such, the block 36 may include a curved bearing surface 37 or the actuator 40 may have a curved or angled bearing surface 53 or both. The one or more bearing surface(s) 37, 53 are preferably curved or angled such that when a torque (τ) is applied to some controlled member 8 (either directly or through a pivot) the force transferred by the controlled member 8 acts on the actuator 40 through the block 36. By having an angle of contact between the actuator 40 and that of a block 36 that is non-normal to the torque load applied to the controlled member 8, the force needed to actuate the lock-release mechanism 16 can be reduced.

The actuator 40 preferably has an adjuster 48 for moving the block 36 in and out of engagement with the notches 29 in the roller support 34. The adjuster 48 may be in any suitable form, such as a cam, detent, surface relief, hole, mound, etc.

In the illustrated embodiment, the adjuster 48 is an annular member or ring 51 having a bearing surface 49 for contacting the block 36 and retaining the block 36 engaged with one of the notches 29 to lock the roller support 34 relative to the ring 51. A recess or relief 50 is formed along the bearing surface 49 and is sized to receive at least a portion of the block 36 therein. The relief 50 includes an arched bearing surface 53 spaced radially relative to the bearing surface 49.

Figure 5:
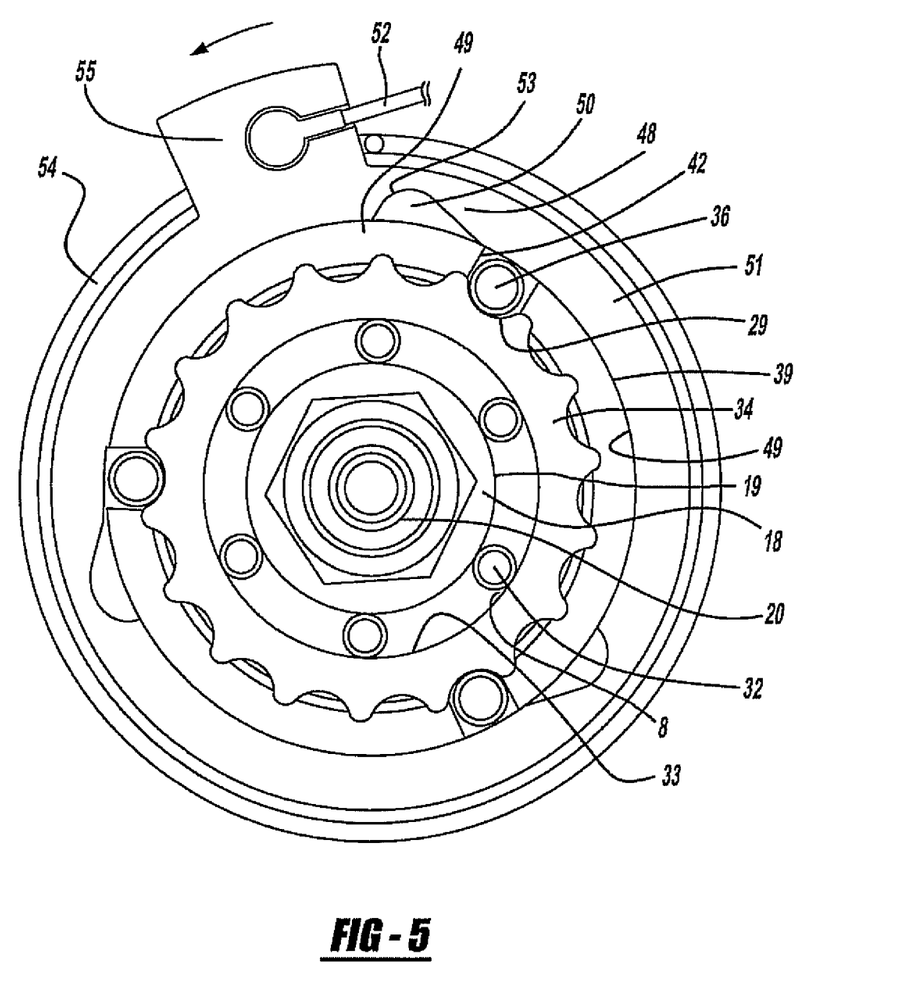
FIG. 5 is a side view of the clutch and lock-release mechanism cutaway to show the lock-release mechanism in a locked position.
Figure 6:
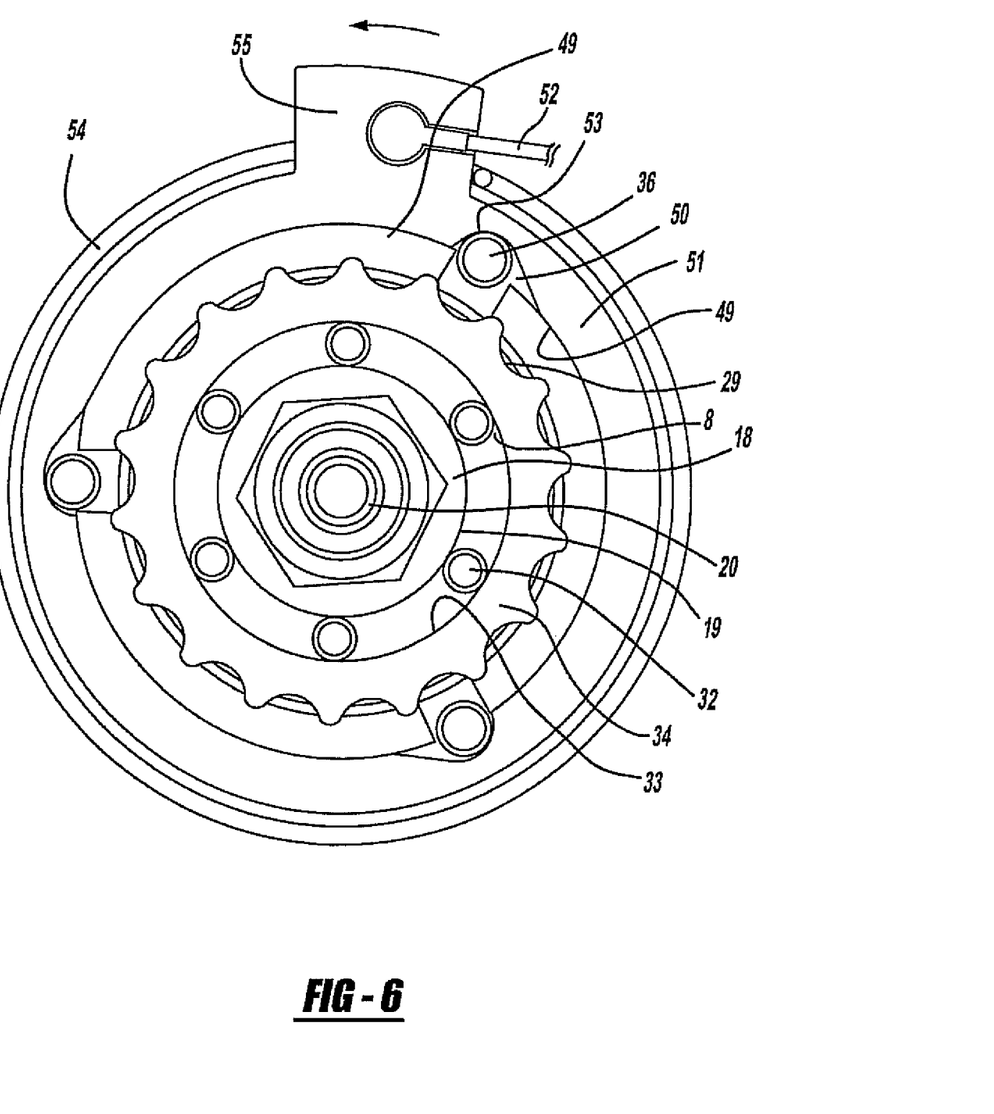
FIG. 6 is a side view of the clutch and lock-release mechanism cutaway to show the lock-release mechanism in an unlocked position.

The ring 51 allows selective engagement and retention of the block 36 with the notches 29 in the roller support 34 by rotation of the ring 51 in one direction toward a locked position, as shown in FIGS. 4 and 5, and disengagement of the block 36 from the notches 29 by rotation of the ring 51 in an opposite direction toward an unlocked position, as shown in FIG. 6. More specifically, in the locked position, the block 36 is disposed in the slot 42 and partially extends beyond the guide member 38 into a corresponding notch 29 of roller support 34, thereby preventing rotation of the roller support 34 relative to the guide member 38. Any forces tending to displace the block 36 from the corresponding notch 29 are resisted by immediate contact of the block 36 with the bearing surface 49. The engaging force delivered by the actuator 40 to the block 36 is preferably delivered at a vector non-normal to the torque load applied to the roller support 34. In the case of a parking brake assembly with a roller clutch 8 coaxially connected to the main pivot 18, a vector non-normal to the torque load applied to the roller support 34 is a force load applied by the main pivot 18.

To release the controlled member 60, the ring 51 is rotated to the unlocked position, wherein the relief 50 in the bearing surface 49 is substantially rotatably aligned with the slot 42 and the block 36 disposed in tie slot 42. The block 36 is then radially displaceable from the notch 29 into the relief 50. Rotation of the roller support 34 causes displacement of the block 36 out of the notch 29 and into the relief 50 in the ring 51. The roller support 34 becomes freely rotatable relative to the guide member 38 once the block 36 is fully displaced from the notch 29.

In FIGS. 3, 5 and 6, the actuating mechanism is shown illustratively to include a cable 52 adapted to be coupled to a receiver 55 on the adjuster ring 51. The cable 52 can be pulled to move the ring 51 to the unlocked position. The cable 52 may be pulled manually or by powered actuators, such as solenoids, linear actuators, rods, cables, springs, magnets, etc. Alternatively, a powered actuator may be directly coupled to tie adjuster 48 for locking and unlocking the lock-release mechanism 16.

The lock-release mechanism 16 may also include a biasing member 54 to bias the actuator 40 in one or more directions, such as toward the locked position. As illustrated, the biasing member 54 biases the ring 51 of tie actuator 40 toward the locked position (indicated by the arrow in FIGS. 5 and 6).

Thus, the ring 51 may be actuated toward the unlocked position by overcoming the biasing force applied by the biasing member 54.

Figure 1:
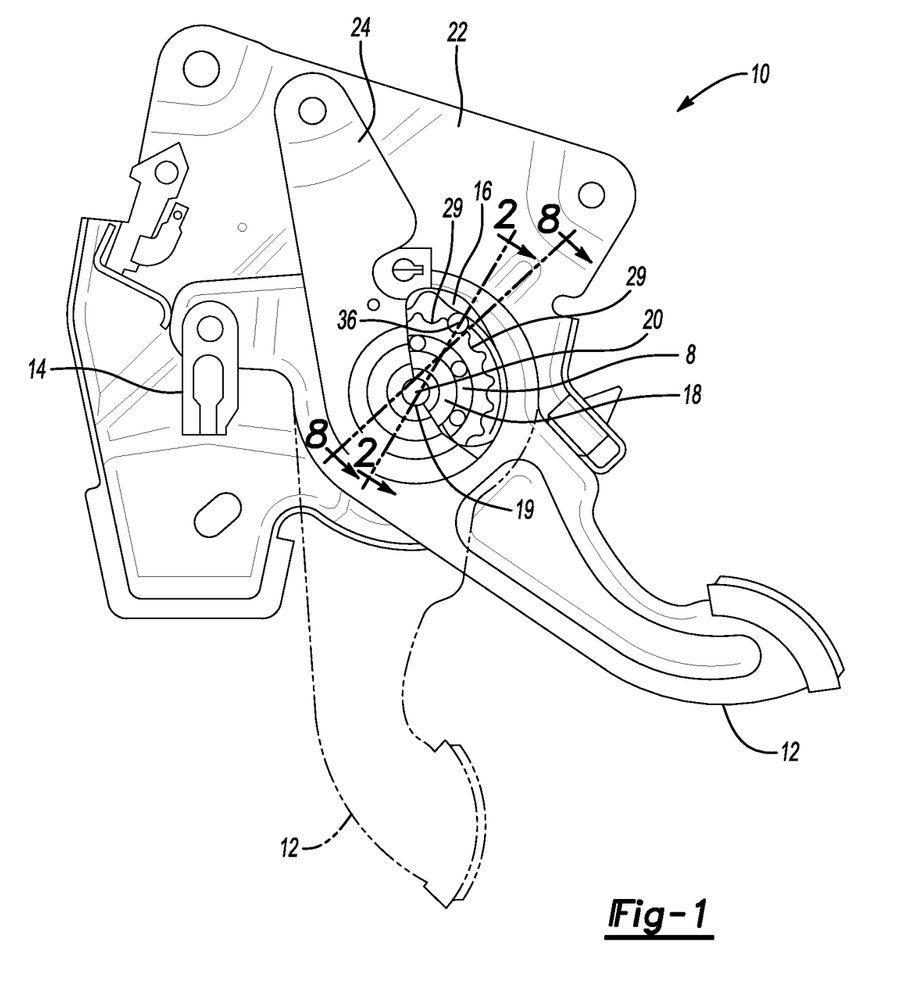
FIG. 1 is a side view of a parking brake assembly according to one embodiment of the invention, which has been cutaway to show a clutch and lock-release mechanism of the parking brake assembly.

In use, particularly when the lock-release mechanism 16 is used with a roller clutch 8 in a parking brake 10 as shown in FIGS. 1-3, a user may actuate the parking brake 10 by moving the lever 12 toward any one of plurality of acuated positions, which is illustrated by the dashed lines in FIG. 1. As the parking brake is actuated, the rollers 32 of the roller clutch 8 allow rotation of the main pivot 18 in one direction relative to the locked and fixed roller support 34, but prevent back motion of the main pivot 18 in the opposite direction. Thus, the lever 12 and main pivot 18 can rotate unidirectionally on the rollers 32 of the roller clutch 8.

To release the lever 12, the user can pull the cable 52 to move the ring 51 to toward tie unlocked position. In the unlocked position, the relief 50 is generally aligned with an associated block 36 to allow the block 36 to move out of fixing engagement with one of tie notches 29 in the roller support 34, thereby allowing the roller clutch 8 and main pivot 18 to rotate together and return the lever 12 from the actuated position to the released and resting position shown by the solid lines in FIG. 1. The lever 12 may be returned to the released and resting position by a conventional lever biasing member (not shown).

Figure 9:
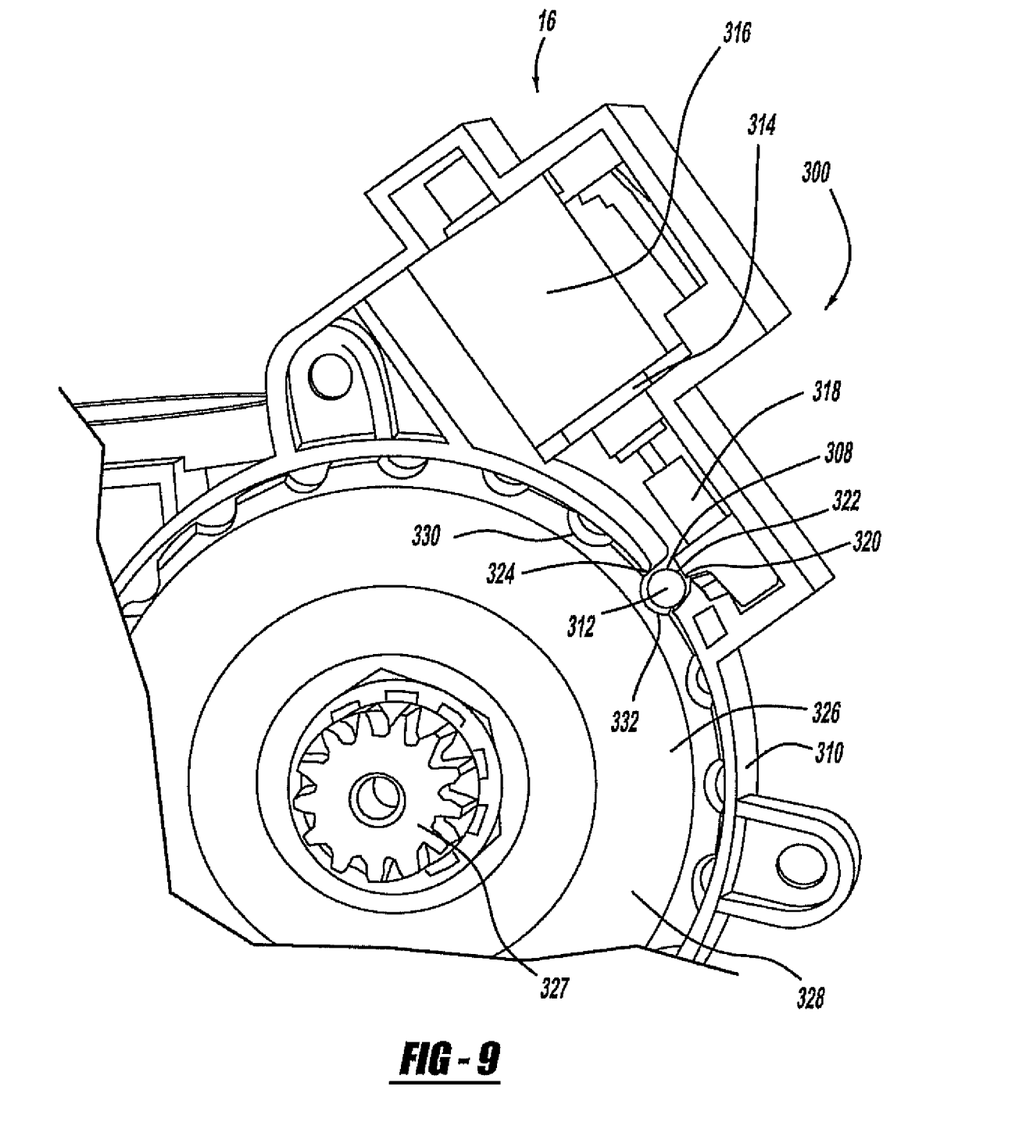
FIG. 9 is a side view of the clutch and lock-release mechanism according to a third embodiment, shown in the locked position.

In FIG. 9, another embodiment of a lock-release mechanism is indicated at 16 and shown in the locked position. The lock release mechanism 16 includes a lock-release member 300, a fixed member 310, a movable block 312 fixed radially in position to the fixed member 310 and a powered actuator 314 for moving the block 312. The block 312, fixed radially in position in this example, is fixed by residing in a pass through slot 324 of tie fixed member 310. The powered actuator 314 may be any suitable powered actuation device, such as electrical, pneumatic, hydraulic, magnetic, etc. The powered actuator as shown includes a solenoid 316, a movable member 318 coupled with the solenoid 316 and a bearing surface 320 coupled with the movable member 318. The bearing surface 320 of the movable member 318 may be used for contacting the bearing surface 308 of the block 312. The bearing surface 308 of the block 312 is preferably curved.

As shown in this example, the controlled member 326 is a pinion 327. The pinion 327 is coupled with a notched body 328 with the notches 330, 332 that are sized to receive at least a portion of the block 312. In practice, the solenoid 316 is activated to extend the moveable member 318 and the bearing surface 320 against the block 312 and force the block 312 into engagement with one or more notches 320, 322 of the controlled member 326. The block 312 may be disengaged from the one or more notches 320, 322 by deactivating the solenoid 316. As described above, the engagement force is preferably delivered at a vector or force that is non-normal to a torque applied to the controlled member 326.

While the invention has been illustrated in detail in the drawings and the foregoing description, the same is to be considered as illustrative and not restrictive in character. For example, changes to shapes and relative positions of the various elements can be made with little effort with only slight or no modifications to the description hereof. For non-limiting illustration purposes, it should be understood that the controlled member and clutch arrangement could be reversed. In such an arrangement the actuator could be positioned within the controlled member with the adjusters of the actuator pointing radially out instead of in and the notches of the controlled member disposed along an inner circumference and open toward the actuator. Therefore, it should be understood that only the preferred embodiments have been shown and described fully and that all changes and modifications that come within the spirit and scope of the invention are desired to be protected.

What is claimed is:

1. A parking brake assembly for a motor vehicle, said parking brake assembly comprising:
a pivot shaft supported in the motor vehicle by a fixed support;
a brake pedal lever pivotally coupled to the pivot shaft by a main pivot having an outer surface;
a roller clutch having a roller support disposed generally coaxially with the main pivot and directly engaging the main pivot, the roller clutch having at least one unidirectional roller disposed between the outer surface of the main pivot and an inner circumferential surface of the roller support and allowing unidirectional movement of the main pivot and brake pedal lever relative to the roller support, the roller support being rotatably coupled to the fixed support; and
a lock-release mechanism having a block selectively movable between a locked position engaging the fixed and roller supports to prevent rotation of the roller support relative to the fixed support and an unlocked position disengaged from the roller support to allow rotation of the roller support, main pivot and brake pedal lever together in a direction opposite the unidirectional movement.

2. The parking brake assembly of claim 1, wherein the block includes a circumferential bearing surface.

3. The parking brake assembly as set forth in claim 2, wherein the roller support includes a notch that receives at least a portion of the block therein and engages the circumferential bearing surface to lock the roller support with respect to the fixed support.

4. The parking brake assembly as set forth in claim 3 including an adjuster movably coupled to the fixed support and actuating the block between engagement and disengagement with the notch in response to the movement of the adjuster relative to the fixed support.

5. The parking brake assembly as set forth in claim 4, wherein the adjuster includes a bearing surface that contacts the circumferential bearing surface and maintains the block in the notch of the roller support.

6. The parking brake assembly as set forth in claim 5, wherein the bearing surface of the adjuster contacts the circumferential bearing surface of the block with a force that is non-normal to a torque load applied to the main pivot.

7. The parking brake assembly as set forth in claim 5, wherein the adjuster includes a recess formed along the bearing surface of the adjuster, the recess receiving at least a portion of the block therein while the block is disengaged from the notches in the roller support.

8. The parking brake assembly as set forth in claim 7 including a guide member fixed in relation to the fixed support, the guide member having a slot allowing movement of the block therethrough between the notch in the roller support and the recess.

9. The parking brake assembly as set forth in claim 7, wherein the guide member is disposed between the roller support and an actuator and the slot in the guide member allows generally radial movement of the block between the notch and the recess.

10. The parking brake assembly as set forth in claim 7, wherein the adjuster is a ring rotatably coupled to the fixed support for movement between the locked position, wherein the recess is rotatably spaced apart from the block and the bearing surface is engaged with the circumferential bearing surface to retain the block in the notch of the roller support, and the unlocked position, wherein the recess is generally rotatably aligned with the notch to allow movement of the block between the notch and the recess.

11. The parking brake assembly as set forth in claim 10 including a biasing member for biasing the ring toward the locked position.

12. The parking brake assembly as set forth in claim 10 including a powered actuator for actuating the adjuster between the locked and unlocked positions.

13. The parking brake assembly as set forth in claim 2, wherein the block is selected from the group consisting of: a cylindrically shaped pin, and a ball.

14. A parking brake assembly for a motor vehicle, said parking brake assembly comprising:
a brake pedal lever disposed about a main pivot having an outer surface;
a roller clutch connected to the brake pedal lever and allowing unidirectional movement of the brake pedal lever, the roller clutch having a roller support disposed generally coaxially with the main pivot, the roller clutch having at least one unidirectional roller disposed between the outer surface of the main pivot and an inner circumferential surface of the roller support; and
a lock-release mechanism releasably fixing movement of the roller support allowing movement of the brake pedal lever in a direction opposite the unidirectional movement allowed by the clutch and applying a force to the roller clutch that is non-normal to a torque load applied to the roller clutch.

15. The parking brake assembly of claim 14, wherein the brake pedal lever is movable about a fixed pivot axis.

16. The parking brake assembly of claim 15, wherein the roller clutch includes a plurality of rollers disposed between the brake pedal lever and the roller support, the rollers being arranged in an annularly and generally concentrically about the fixed pivot axis of the brake pedal lever.

17. The parking brake assembly of claim 14, wherein the roller support has one or more notches for receiving a movable block.

18. The parking brake assembly of claim 17, wherein the lock-release mechanism includes a ring having a bearing surface for maintaining the block in the notch and a recess formed in the bearing surface for receiving at least a portion of the block while disengaged from the notch.

19. The parking brake assembly as set forth in claim 18, wherein the ring is selectively movable between a locked position, in which the bearing surface retains the block in the notch of the roller support, and an unlocked position, in which the recess is generally aligned with the notch to allow movement of the block between the notch and the recess.

20. A parking brake assembly for releasably actuating a brake of a motor vehicle, said parking brake assembly comprising:
a brake pedal lever disposed about a main pivot having an outer surface;
a primary brake cable connecting the brake pedal lever and the brake of the motor vehicle;
a clutch connected to the brake pedal lever and allowing unidirectional movement of the brake pedal lever for actuating the brake via the primary brake cable travel, the clutch disposed generally coaxially with the main pivot, the clutch having at least one unidirectional roller disposed between the outer surface of the main pivot and an inner surface of a moveable support; and a lock-release mechanism connected to the clutch and allowing movement of the brake pedal lever in a direction opposite the unidirectional movement allowed by the clutch;

wherein the parking brake assembly has a primary cable travel loss of less than one millimeter.

21. The parking brake assembly as set forth in claim 20, wherein the primary cable travel loss is less than 0.5 millimeters.

22. The parking brake actuating as set forth in claim 20, wherein the primary cable travel loss is less than 0.15 millimeters.

* * * * *